US005434967A

United States Patent [19]

Tannenbaum et al.

[11] Patent Number: 5,434,967

[45] Date of Patent: Jul. 18, 1995

[54] DECISION VARIABLE HARDWARE LOGIC AND PROCESSING METHODS FOR GRAPHICS DISPLAY SYSTEM

[75] Inventors: David C. Tannenbaum, Hurley; Andrew D. Bowen, Saugerties; Robert S. Horton, Hurley; Leland D. Richardson, Kingston; Paul M. Schanely, Hurley, all of N.Y.

[73] Assignee: International Business Machines Corporation, Armonk, N.Y.

[21] Appl. No.: 967,298

[22] Filed: Oct. 27, 1992

[51] Int. Cl.[6] .............................................. G06F 15/16

[52] U.S. Cl. ..................................... 395/163; 395/162

[58] Field of Search ............... 395/118, 162, 163, 375, 395/800; 364/228, 225.6, 231.8, 259.2, 259.8, 259.9, 261, 261.1, 261.5, 933.61, 938.1, 941.1, 948.34, 264.1

[56] References Cited

U.S. PATENT DOCUMENTS

| | | | |
|---|---|---|---|
| 4,816,814 | 3/1989 | Lumelsky | 340/747 |
| 5,230,039 | 7/1993 | Grossman | 395/130 |
| 5,274,760 | 12/1993 | Schneider | 395/162 |

*Primary Examiner*—Mark R. Powell
*Assistant Examiner*—U. Chauhan
*Attorney, Agent, or Firm*—Heslin & Rothenberg

[57] ABSTRACT

Hardware logic and processing methods for enhanced data manipulation within a graphics display system are described. The graphics display system includes a graphics processor sub-system and a rendering subsystem which are serially connected for pipeline processing of an interleaved stream of commands and data. One or more status bits or XBITs are defined within each rasterizer of a multi-rasterizer rendering sub-system. An XBIT, which may comprise a ZBIT, a UBIT, or an RBIT, etc., provides a mechanism for introducing execution of various logic functions within the rendering sub-system portion of the computer graphics adapter. Corresponding data processing methods are also described.

20 Claims, 6 Drawing Sheets

GEOMETRIC DATA
GRAPHICS PROCESSOR SUB-SYSTEM
RENDERING SUB-SYSTEM
RASTER ENGINE
MEM DATA
MEM ADDR./CONTROL
FRAME BUFFER MEMORY (VRAMs & DRAMs)
RGB (DIGITAL)
DISPLAY INTERFACE (RAMDAC)
R
G
B
(ANALOG)
DISPLAY DEVICE (CRT)
10
11
12
14
16
18
19
20
21

DECISION VARIABLE HARDWARE LOGIC AND PROCESSING METHODS FOR GRAPHICS DISPLAY SYSTEM

TECHNICAL FIELD

The present invention relates in general to information handling systems, and more particularly, to hardware logic and processing methods for enhanced data manipulation within a graphics display system.

BACKGROUND ART

Computer graphics display systems, e.g., CAD/-CAM graphics workstations, are widely used to generate and display two-dimensional images of three-dimensional objects for scientific, engineering, manufacturing and other applications. Ever present demands for higher quality renderings of more complicated images continually require greater computational throughput by such systems. Typically, a graphics display system is subdivided into a graphics processor sub-system and a rendering sub-system which are interconnected such that commands/data are processed through the sub-systems in a pipeline manner.

Often, a problem arises in the graphics processor sub-system in that a course of action (referred to herein as a "conditional command") may depend upon prior pipeline processing. Specifically, data information in the form of a serial stream is input into the pipeline at the graphics processor sub-system and processed until resultant data is attained at the rendering sub-system. This resultant data must then be fed back to the graphics processor portion of the pipeline for use in implementing the conditional command. To ensure the accuracy of data fed back from the frame buffers to the graphics processor, the existing processing approach essentially dictates a flushing of the pipeline (i.e., a processing of all commands/data prior to the conditional command) before the data is fed back to the graphics processor subsystem for consideration. Thus, a latency necessarily arises within pipeline processing from the consideration of the conditional command.

By way of a more specific example, certain graphic system rendering algorithms may rely upon a query of a frame buffer's state to gate the rendering function. The problem is realized in, for example, the case of annotation text where a character string (i.e., multiple glyphs) is either rendered or not rendered based upon the visibility of a single pixel on the screen. In such a case, the pixel of interest must be fed down the pipeline, and the system must ascertain whether the pixel of interest has been placed into the Z-buffer (i.e., identified as visible). Next, the pipeline is flushed to ensure that data prior to the conditional block of commands/data has been rendered and handled in the Z-buffer. Finally, a test is made of the pixel of interest to determine whether to proceed to send the entire associated glyphs.

In a particular case, a polymarker is a PHIGS command for drawing one or more graphic markers on a display. Its requirements include testing for visibility, highlighting, and detectability; and satisfaction of the choices of color, marker size and marker type. Today's method of handling the function is extremely inefficient because the pipeline is forced to be emptied prior to rendering each marker, and then after completion, there is necessarily an associated delay until data is rendered again. The invention described herein provides a solution to this problem and is applicable to rasterizer logic in either a single rasterizer or multi-rasterizer environment.

In another aspect of the prior art, existing graphics processor systems typically rely on software to accomplish certain functions. For example, multiple comparisons at a pixel location are conventionally implemented in software, as are inequality considerations in general with reference to a previous pixel value. The need for such data processing may arise, for example, in a constructive solid geometry (CSG) application. Constructive solid geometry is described in an article by J. Rossignac and J. Wu entitled: "Correct Shading of Regularized CSG Solids Using a Depth-Interval Buffer," Eurographics Workshop on Graphics Hardware at the Ecole Polytechnique Federale, Lausanne, Switzerland (Sept., 1990). Briefly, CSG facilitates certain manipulation of solid object functions, such as would be necessary to drill a hole within a cube. Up to this point, the Boolean operations employed have necessarily been conducted in software. Obviously, to the extent implementable in hardware, enhanced system performance can be expected. This issue is also addressed by the present invention through an extension of the concept of state flagging within the rendering sub-system to include utility buffer results and raster results upon which such a determination can be made.

Thus, a need for enhanced decision variable hardware logic and associated processing methods for computer processing in general and graphics display systems in particular exists within the art. To the extent performance is enhanced, commercial advantage is attained in the competitive and continually evolving field of computer processing.

DISCLOSURE OF THE INVENTION

Briefly summarized, the present invention provides in a first aspect a computer system for pipeline processing a stream of interleaved commands and data containing at least one conditional command the execution of which requires processing results from a prior portion of the interleaved stream. The conditional command has a portion of the interleaved stream of commands and data associated therewith. The pipeline processing system includes a first processing sub-system for receiving the interleaved command and data stream and, commensurate therewith, commencing serial processing of the received stream in a pipeline fashion. In addition, a second processing sub-system is connected to the first processing sub-system for continuing serial pipeline processing of the received stream of interleaved commands and data. The second processing sub-system includes logic for identifying a conditional command within the stream of interleaved commands and data. Further, the second processing system includes logic for executing the conditional command based upon prior processing results whenever the condition upon which the conditional command depends is satisfied. Alternatively, logic is provided for purging that portion of the interleaved stream of commands and data associated with the conditional command whenever the condition is unmet such that pipeline processing of the stream of commands and data remains unbroken unless commands and data associated with the conditional command are purged by the second processing sub-system. Enhancements to this basic embodiment are also described and claimed.

In another aspect, a graphics display adapter designed to handle a conditional command disposed within an interleaved stream of commands and data is provided. The adapter includes a rendering sub-system having an input for receiving the stream of commands and data. This rendering sub-system includes a bit block transfer node connected so as to initially receive the generated stream of commands and data from the graphics processor sub-system. Rasterizer logic is connected to the bit block transfer node such that bidirectional transfer of data between the rasterizer logic and the bit block transfer node is allowed. A frame buffer is connected to the output of the rasterizer logic for storing distance-related data, occlusion mask data, and color component data. The bit block transfer node and the rasterizer logic contain hardware logic for executing within the rendering sub-system a conditional command forming part of the generated stream of commands and data received from the graphics processor sub-system.

In yet another aspect of the present invention, a method for pipeline processing of a stream of interleaved commands and data through a computer processing system is provided. The computer processing system includes first and second serially connected processing sub-system. The interleaved stream of commands and data contains a conditional command the execution of which requires processing results from a prior portion of the interleaved command and data stream. Further, the conditional command has associated therewith a portion of the interleaved stream of commands and data. The processing method includes the steps of: receiving the interleaved stream of commands and data at an input to the first processing sub-system; simultaneously therewith, commencing serial processing of the received commands and data stream through the first processing sub-system and the second processing sub-system in a pipeline fashion; identifying a conditional command within the stream of interleaved commands and data; and executing the conditional command within the second processing sub-system if the condition for the conditional command is met based on prior processing results, otherwise employing the second processing sub-system to discard that portion of the interleaved stream of commands and data associated with the conditional command. Thus, pipeline processing of the stream of commands and data remains unbroken unless the conditional command is discarded by the second processing sub-system. Specific enhancements to this basic processing approach are also described and claimed.

Again, pursuant to the present invention the graphics processor sub-system portion of the graphics system will see no interruption in the pipeline assuming that the conditional command is satisfied. A continuous stream of commands and data passes through the graphics processor sub-system. The approach presented provides overall performance gain by allowing the pipeline to remain as unidirectional and as uninterrupted as possible. The floating-point unit in the graphics processor sub-system continues to process data regardless of whether the data is ultimately rendered.

Further, the techniques employed are applicable to any rasterizer, and can be easily extended for use in a multi-rasterizer environment. The hardware logic concepts presented can also accommodate utility buffer results and rasterizer results if desired. The presented invention provides a mechanism for searching an array of pixels solely within a rendering sub-system at the frame buffer level, without tying up the floating-point unit within the graphics processor subsystem. Additionally, the burden of determining whether any pixels have been rendered by a set of rasterizer commands is lifted from the floating-point unit and implemented in hardware within the rendering sub-system. The concepts presented can be expanded and generalized to any computer system. To the extent performance is enhanced, commercial advantage is attained. The concepts presented are inexpensive to implement and readily implementable with existing technology.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

Figure 1:
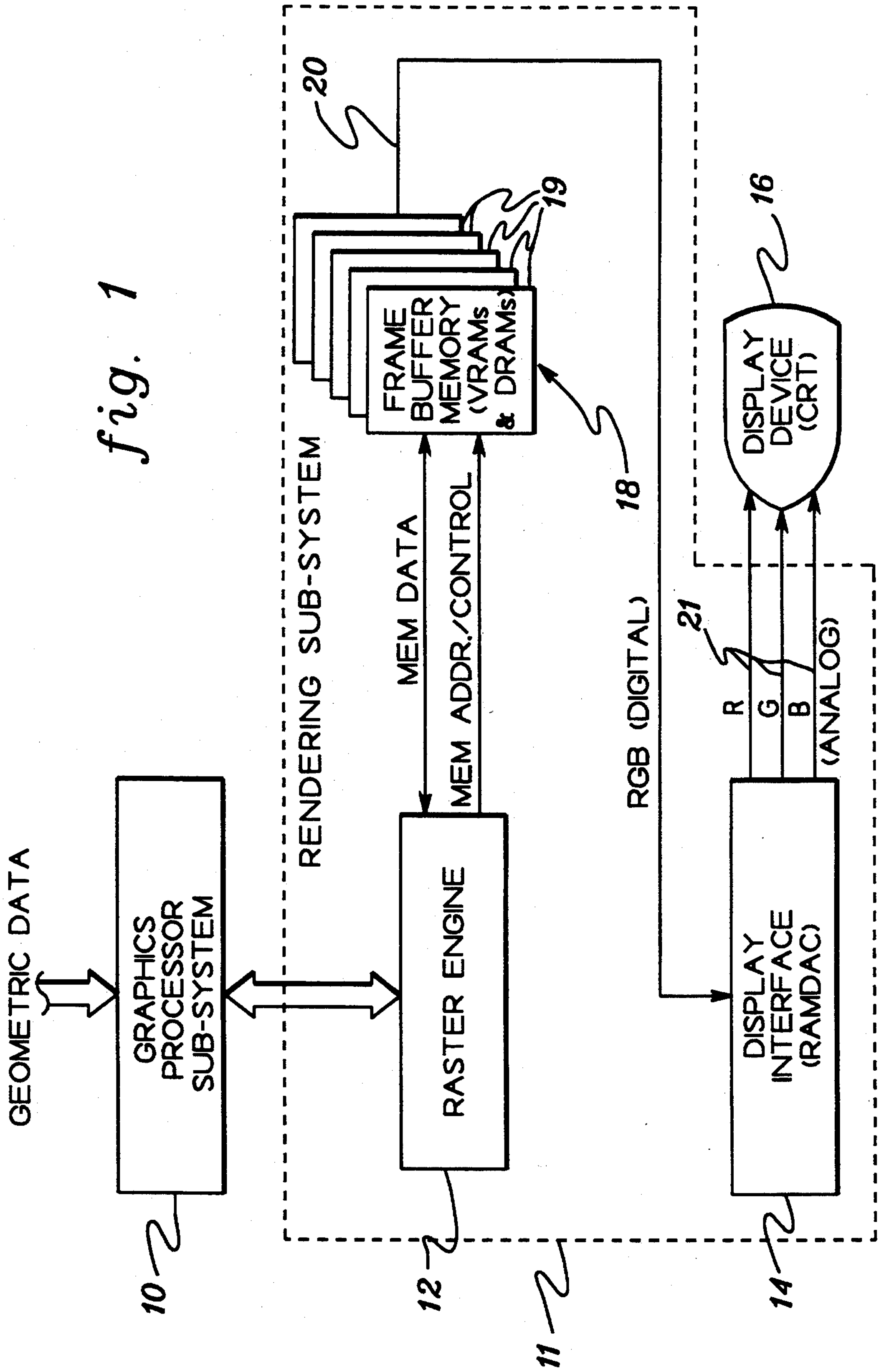
FIG. 1 is a block diagram illustration of a graphics system structure.

Reference is now made to the drawings wherein the same reference numerals are used throughout multiple figures to designate the same or similar components.

A graphics system is shown schematically in FIG. 1. A graphics processor sub-system 10 performs transformations and generates from received geometric data a modified data stream of vertices representative of an object to be rendered. Along with the axis coordinates, a color, usually specified by red, green and blue components (RGB), is generated for each vertex required to describe an object to be rendered. Vertices are sent to a raster engine 12 within a rendering sub-system 11. The rendering sub-system may start at any X,Y,Z coordinate location and generate a sequence of adjacent pixels, typically proceeding in a vertical or horizontal direction. A display interface (or RAMDAC) 14 receives ordered pixel data in the form of digital color (RGB) data via line 20. This data is provided by a frame buffer memory 18 from the serial output ports of multiple VRAM modules and is ordered to correspond to screen pixel locations. The display interface operates to generate the analog signals RGB, on line 21, necessary to display the image on a screen device (or CRT) 16, along with the appropriate control signals. Although a CRT monitor device is shown, the graphics adapter processing techniques discussed herein work equally well in combination with any two-dimensional display device, such as a plotter, printer, or other monitor type.

Again, associated with raster engine 12 is frame buffer memory 18 which typically includes a plurality of DRAMs and VRAMs 19. Memory address and control information is transferred on a first bus from engine 12 to memory 18, while memory data is transferred between the engine and the frame buffer memory on a second bus as shown. In today's graphics systems, a screen size of 1280×1024 pixels is very common. Assuming that two-megabyte video memory modules are employed, each of which is organized into 512×512×8 bits deep storage locations, 5 VRAM modules is an ideal number to store pixel intensity data for the 1280×1024 screen size. Thus, raster engine 12 is typically provided with X,Y pixel screen address data which must be divided to identify a particular column location within a specific module where the corresponding intensity information is stored.

Figure 2:
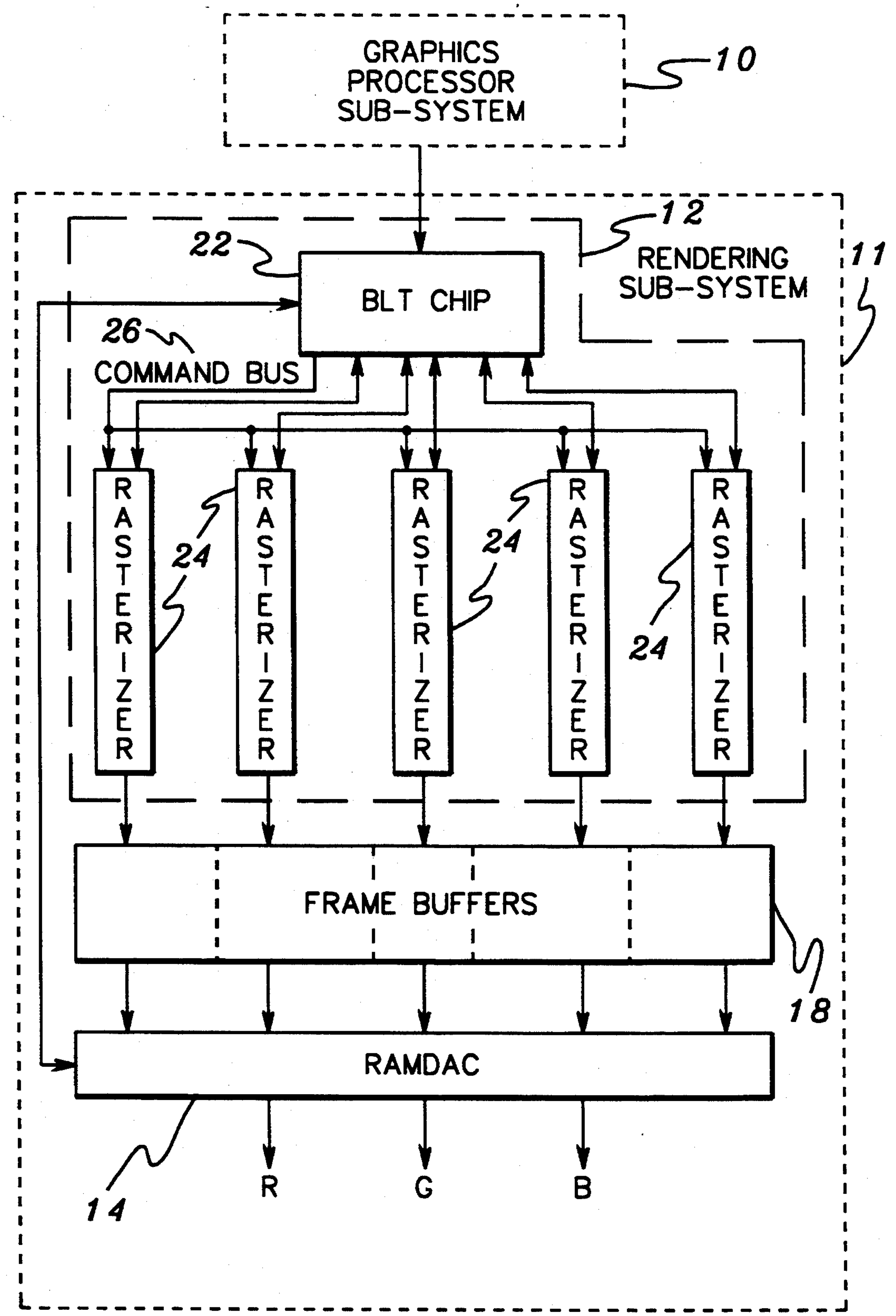
FIG. 2 is a block diagram illustration of one embodiment of a rendering sub-system for the graphics system structure of FIG. 1.

A more detailed embodiment of rendering sub-system 11 is shown in FIG. 2. This embodiment comprises a multi-rasterizer system. From graphics processor sub-system 10, data is initially fed to a bit block transfer (BLT) circuit 22 which is responsible for disseminating information and maintaining synchronization within the multi-rasterizer rendering sub-system. More particularly, BLT 22 operates to: (1) read an array of pixels on screen back to system memory, e.g., within a host workstation (not shown); (2) read data from system memory down to frame buffers 18 for display or storage into, for example, a Z-buffer for use in an algorithm to be executed; and (3) manipulate data on screen, such as screen-to-screen copying. The invention presented herein employs the recognition that BLT 22 is a common focal point for the multiple rasterizers within rendering sub-system 11. (One partial embodiment of a BLT circuit pursuant to the present invention is presented in FIG. 5 and discussed below.)

As noted, the rendering sub-system embodiment of FIG. 2 is a parallelized system with five rasterizers 24, each of which is connected between BLT chip 22 and a corresponding portion of frame buffers 18. Each rasterizer 24 communicates only with a subset of the entire frame buffer, i.e., each frame buffer portion comprises (in this example) one fifth of the total frame buffer such that when taken in aggregate an entire frame buffer is defined. Numerous interleaving schemes are employed in the open literature for such a multi-rasterizer system.

Each rasterizer comprises a mechanism for computing coefficients or quantities, for example: necessary for Gouraud shading, or other shading logic; X,Y interpolating functions; all modification logic or per fragment operations (i.e., on a per pixel basis each rasterizer can compare data with a number of different quantities in the frame buffer, e.g., window testing); color values; Z value; and utility value. All of these computations are conducted within each rasterizer in parallel within the rendering sub-system.

One processing difficulty encountered by multi-rasterizer rendering sub-system 11 arises when the graphics display system must check the Z buffers to determine whether a particular pixel is visible. Two inquiries are necessary. First, does a particular rasterizer have the pixel of the interest and, if yes, is the pixel visible? (Obviously, only one of the five rasterizers 24 will actually be assigned to the particular pixel of interest.) All known graphics display systems evaluate these issues at the top of the graphics processor node (not shown) within graphics processor sub-system 10. The disadvantage to such an approach is that there must be communication from frame buffers 18 back to graphics processor sub-system 10, which then must determine in software the answers to the inquiries. In addition, the pipeline must be flushed to ensure the integrity of the frame buffer data being returned to sub-system 10. The present invention eliminates this feedback and software evaluation approach by evaluating the issue in hardware within the rendering sub-system itself, i.e., BLT 22 and multi-rasterizers 24. Communication between BLT 22 and the multiple rasterizers 24 is at hardware performance rates. A rasterizer command bus 26 is employed for BLT command control of rasterizers 24.

Each rasterizer 24 has a bi-directional path connection to BLT 22. During normal operation, information flows from BLT 22 to rasterizers 24. However, in certain limited circumstances, i.e., the circumstances to which the present invention applies, information flows from rasterizers 24 to BLT 22. For example, the BLT can read back the status of a ZBIT, UBIT or RBIT (discussed below) or perform screen to screen copies or screen to system type reads, i.e., read information back from the frame buffers for some other operation.

In a first aspect of the present invention, the prior art need for costly polling of each rasterizer by the control processor (i.e., the graphics processor sub-system) is eliminated. Each rasterizer is herein equipped with a group of bits (1 or more) that are independently controllable within that rasterizer to influence the rendering of a given group of pixels. In one embodiment, there are three bits defined ZBIT, UBIT and RBIT. The ZBIT holds the results of a Z compare operation. The UBIT provides similar function for the utility compare function, while the RBIT is set whenever a pixel is rendered to the screen and is used to determine if any part of an image is drawn. Because the value of the ZBIT is preferably updated only upon receiving an explicit command, the value is modal. Thus, a single Z buffer test can be used to affect (i.e., suppress or allow) the rendering of future pixels. This control over further rendering can be terminated at any time by the sending of an appropriate command.

Implementation of the present invention within a single-raster system is relatively straightforward. An XBIT (used generically herein to refer to a ZBIT, UBIT or RBIT, etc.) resides at a convenient point in the pipeline where it can cause the disposal of either primitives or the rasterized pixels. This simple approach is not possible in a multi-rasterizer system. Each rasterizer must be aware of the current state of the other rasterizers. In an annotation text example, if a single point is tested, then only one of the n rasterizers will have the information necessary to discard the non-rendered data. Therefore, a handshaking scheme is necessary.

Three approaches are possible. Namely, one of the following could be employed: (1) synchronization pins on the rasterizers; (2) consolidation and redistribution of the XBITs by common logic; or (3) consolidation of the XBIT state by some common logic. The first design requires the use of two open-drain buses that connect all of the rasterizers. One signal would be used to generate a valid signal indicating that all rasterizers have reported their XBIT state onto the other bus. The second bus is used to indicate whether any rasterizer has its XBIT set. Because of the pin requirements, this approach is not presently preferred. Additionally, the implementation restricts itself to a limited set of tests because of the nature of the open-drain bus.

The second approach is to have a handshaking command which causes each rasterizer to report the state of its XBIT to the distribution logic (e.g., the BLT chip). The BLT could then consolidate the data from all of the rasterizers and send a command to the rasterizers informing them of the composite XBIT state. Again, although possible, the option is not preferred since better performance can be gained by discarding subsequent commands at the BLT level (i.e., the third option). This guarantees that gratuitous memory accesses and rasterizations are not performed on data to be discarded.

As indicated above, the third option involves the BLT consolidating the XBIT status and purging appropriate primitives before sending them to the rasterizers. This is accomplished via a single command design. A pipeline command is passed that indicates which XBIT should be polled and what the condition is under which the ensuing data should be purged (e.g., all XBITs are zero, any XBIT is zero, etc.). All subsequent commands are discarded by the BLT until the terminating command is sent. (In the preferred embodiment, the terminating command is the same as the initiating command.) This third option is discussed further below with reference to FIG. 5.

Additional functions could also be supported by the XBIT concepts presented herein. For example, the ZBIT could provide support for multi-compare operations. The ZBIT could be used as part of the compare result and/or could be loaded based on a current compare result. For example, if an interval test is desired the following pseudocode could be executed:

```
Desired Result: Test for Z1 ≦ Z ≦ Z2
        I. Compare: Z1 ≦ Z
           ZBIT = Result_of_Compare
        I. Compare: Z2 ≧ Z
           Compare_Result:   ZBIT AND
                             Result_of_Compare
```

The UBIT provides a similar function for the utility modification logic. As an example of a UBIT's use, consider the problem of determining if a particular value exists within the frame buffer. The operation can be accomplished using the following algorithm:

1. Create the initial data to be searched (via any means);
2. Given the extent of the area to be searched, set up a bit block transfer (BLT) covering the region (which will cause each pixel to be examined);
3. Set up the utility compare operation to set the UBIT if the sought after value is found; and
4. Read back the UBITs from each of the rasterizers and return the composite OR value of the bits.

By way of further example, an RBIT could be set whenever a pixel is written, which could be useful for algorithms requiring a termination condition. For example, the trickle algorithm used for rendering CSG (constructive solid geometry) ends one portion of the algorithm if, after a set of steps, no new pixels are rendered. The RBIT is tested for each iteration of these steps until it is no longer set, indicating no new pixels have been rendered.

Figure 3:
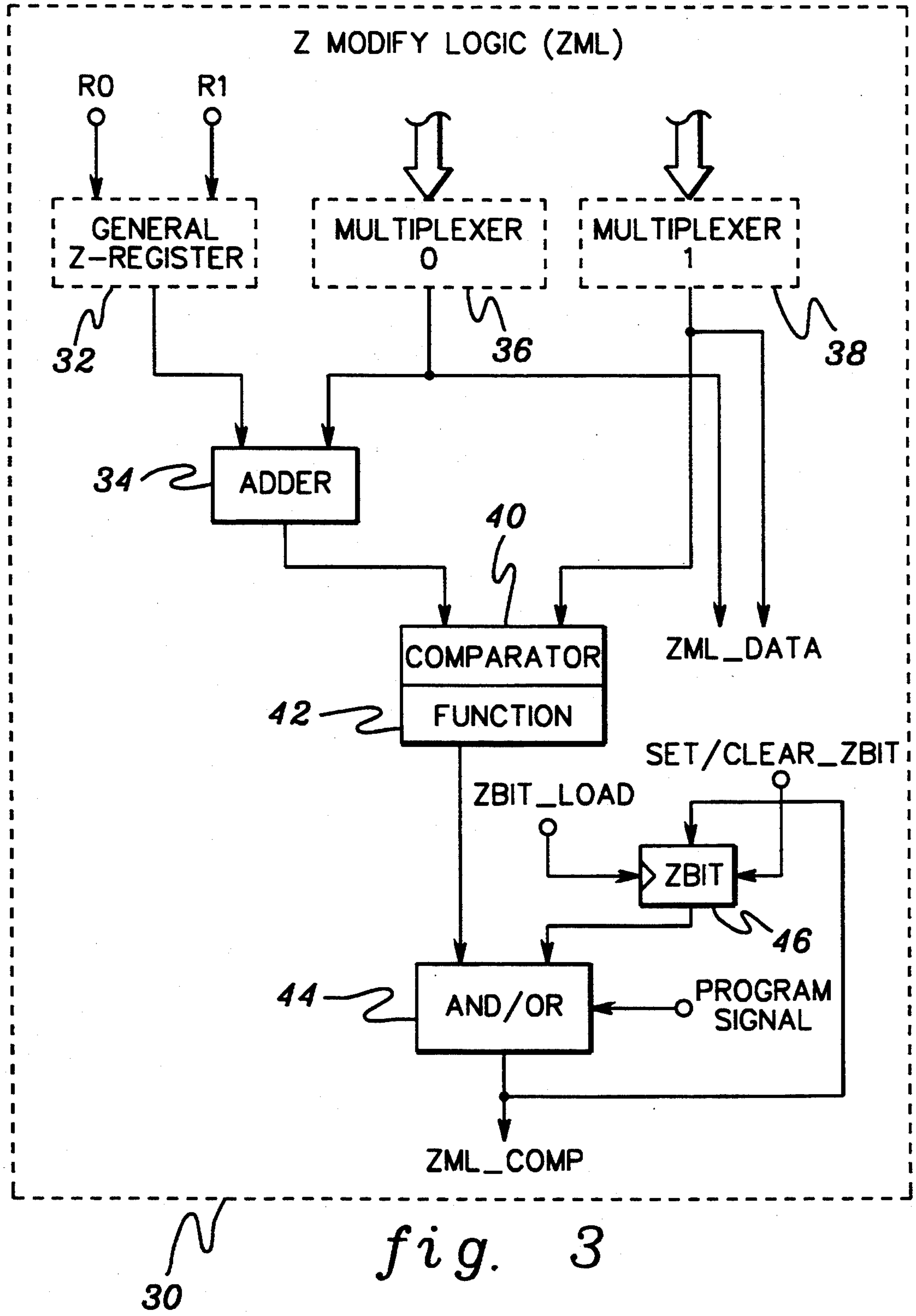
FIG. 3 is a block diagram representation of one embodiment of Z modify logic (ZML) pursuant to the present invention for the rasterizers of the rendering sub-system of FIG. 2.
Figure 4:
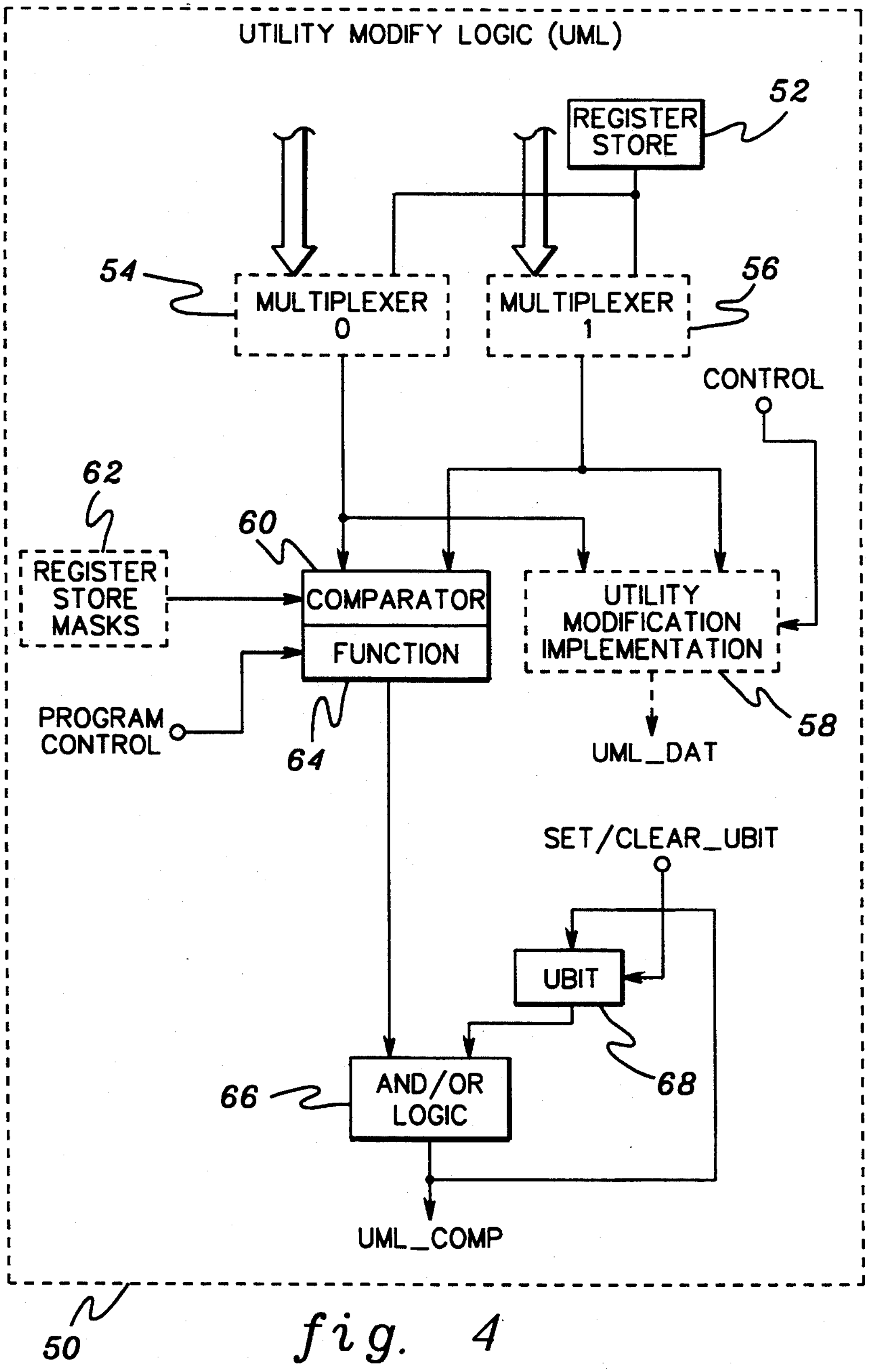
FIG. 4 is a block diagram representation of one embodiment of utility modify logic (UML) pursuant to the present invention for the rasterizers of the rendering sub-system of FIG. 2.

Implementations of a ZBIT and a UBIT pursuant to the present invention for multiple parallel rasterizers are next presented by way of example with reference to FIGS. 3 & 4, respectively.

Referring first to FIG. 3, wherein a Z modify logic (ZML) circuit 30 is assumed to be replicated within each rasterizer (24) of multi-rasterizer rendering subsystem (11) (FIGS. 1 & 2). Logic 30 resides within each rasterizer at a location appropriate for receiving rasterized pixel information. Various sources of pixel information are selected among by a first multiplexer 36 and a second multiplexer 38. A general register 32 receives an R0 and an R1 command signal to load a particular portion thereof. Various register embodiments are known in the open literature. Register 32 may be used, for example, to ascertain whether a particular pixel is within a certain Z tolerance value. Output from register 32 is combined with the output from a "multiplexer 0" 36 in an adder 34. Also output from "multiplexer 0" 36 and a "multiplexer 1" 38 is a data signal ZML_DATA, which is selectively constructed from bits held within "multiplexer 0" and "multiplexer 1" using any well know merge function.

Output from adder 34 comprises a first input to a comparator 40, which is coupled in series to function logic 42. A second input to comparator 40 is received from "multiplexer 1" 38. Both comparator 40 and function 42 are assumed to be programmable. (Each rasterizer is assumed to be programmable to a limited extent.) With the use of program options provided herein, each pixel processing cycle may be independently programmed. This per cycle/per pixel granularity allows a much larger class of algorithms to be solved using the hardware implementations presented. Such a general approach is to be contrasted with a modally programmable system (i.e., a system programmable only over an entire primitive or algorithm.) Output from function logic 42 comprises a first input to AND/OR logic 44. The second input to logic 44 is the output of a ZBIT 46.

Logic 44 is a Boolean operation wherein the result of function logic 42 may be ANDed or ORed with the value saved in ZBIT 46. Logic 44 is programmable, receiving a program signal as diagrammed. ZBIT 46 also receives a Set/Clear_ZBIT signal (e.g., to initialize the ZBIT to a particular value). The ZBIT_LOAD signal determines whether or not ZBIT 46 should be updated. Each rasterizer allows for multiple cycles for a pixel and can control on which cycle a signal is applied from ZBIT 46 to logic 44. The output of logic 44, i.e., ZML_COMP, is a result which is supplied to other portions of the rendering sub-system, for example, to determine whether or not to write a particular pixel or to determine which branch to take in a branch operation. It is up to the rest of the system on how to use the provided signal.

As a specific example, the structure presented could be employed in a multiple Z compare operation (e.g., a greater than operation and a less than operation). In a first pass through the logic, a Z value is compared in a greater than operation against a value in general Z register 32, with the comparison result then being stored in ZBIT 46. A second pass through the structure allows a less than comparison to be performed, which may then be ANDed with the greater than comparison held in ZBIT 46. The result from logic 44 comprises the desired composite answer. In essence, a hysteresis type function is attained with the use of ZBIT 46.

With the structure presented, two types of comparisons may be made. First, as noted, multiple checks on a single pixel may be performed or multiple Z buffers compared for a particular pixel. Secondly, a previous Z value from a previous pixel (i.e., another pixel in the same rasterizer) can be compared in order to accumulate information over an array of pixels. For example, if two pixels in a row are greater than a preset value, then a particular operation could be performed. This is believed to comprise the first area sort rasterizer architecture.

To summarize, the novel ZBIT structure presented in FIG. 3 augments the functionality of Z comparison. In particular, by inclusion of ZBIT architecture in a rasterizer as shown, a hysteresis function is possible, as is a double sided comparison function. Further, the structure presented allows comparisons to be made between neighboring pixels within the same rasterizer. Information for multiple rasterizers is brought together at a single node, for example, within the BLT chip.

One embodiment of a utility modify logic (UML) 50 pursuant to the present invention is shown in FIG. 4. The design and operation of utility modify logic 50 is similar to that described in connection with Z modify logic (30) of FIG. 3.

Specifically, parallel multiplexers, "multiplexer 0" 54 & "multiplexer 1" 56, each receive a series of inputs from internal buses within the associated rasterizer, along with input from a general register store 52. Register 52 is a general utility register which can be loaded by an appropriate mechanism and used, for example, to provide constant values to the multiplexers. Output from multiplexers 54 & 56 is fed in parallel to a utility modification implementation block 58 and a comparator 60. Block 58 comprises traditional utility modify logic circuitry and may include, by way of example, modify logic, utility modify masks, and Boolean operation select circuitry. Output from utility modification block 58 comprises a UML_DAT signal.

Comparator 60, which may be a general purpose comparator, can be supplied a selected utility compare mask from a register store mask 62. Associated with comparator 60 is programmable function logic 64, which receives a program control signal. Again, logic 50 is assumed to be programmable on a per cycle, per pixel basis. Output from function logic 64 is supplied to a first input of an AND/OR logic 66. Logic 66 is substantially identical to logic (44) of the Z modify logic (30) of FIG. 3. The second input to logic 66 is received from a UBIT 68. The second input is directly coupled to the UBIT such that the UBIT is automatically loaded and unloaded every cycle. A Set/Clear_UBIT signal operates as a control signal to UBIT 68. (Other connection implementations of UBIT 68 with logic 66 are obviously possible. For example, a UBIT_LOAD signal (not shown) could be employed as a control on the updating of UBIT 68.) A resultant composite signal UML_COMP is output from logic 66. This signal is a function of the result of function logic 64 in combination with an ANDing or ORing thereof with the data in UBIT 68.

The differences between the ZML (30) implementation of FIG. 3 and the UML 50 implementation of FIG. 4 are based primarily on differences in the information being processed. For example, there will be a difference in operand widths between Z value data (e.g., 24 bits wide) and data for the unspecified algorithms to be implemented in the utility modify logic. Further, the comparator functions will typically be different. For example, UML data may comprise a series of bits in an 8 bit field where each bit is totally unrelated to the others in the field. Thus the reason for the comparator masks held in register 62 in the UML (i.e., the masks allow the masking off of certain bits having little relevance to a subject algorithm).

The ZML and UML are mutually independent and fully parallel logic circuits. In one rasterizer embodiment pursuant to the present invention, only ZML circuits such as depicted in FIG. 3 are employed, while in another embodiment, only UML circuits are employed within the rasterizers. Presently, a preferred implementation is believed to comprise the combination of both ZML and UML circuitry within each rasterizer. Further, a ZML circuit pursuant to the present invention could be combined with standard utility modify logic, as could a UML circuit pursuant to the present invention be combined with a more standard Z modify logic implementation. As a further modification, each bit (i.e., ZBIT, UBIT or RBIT) could be easily expanded to track a number of values. In such an implementation, the new bit block (ZBIT, UBIT or RBIT) would function as a cache within the rasterizer.

Figure 5:
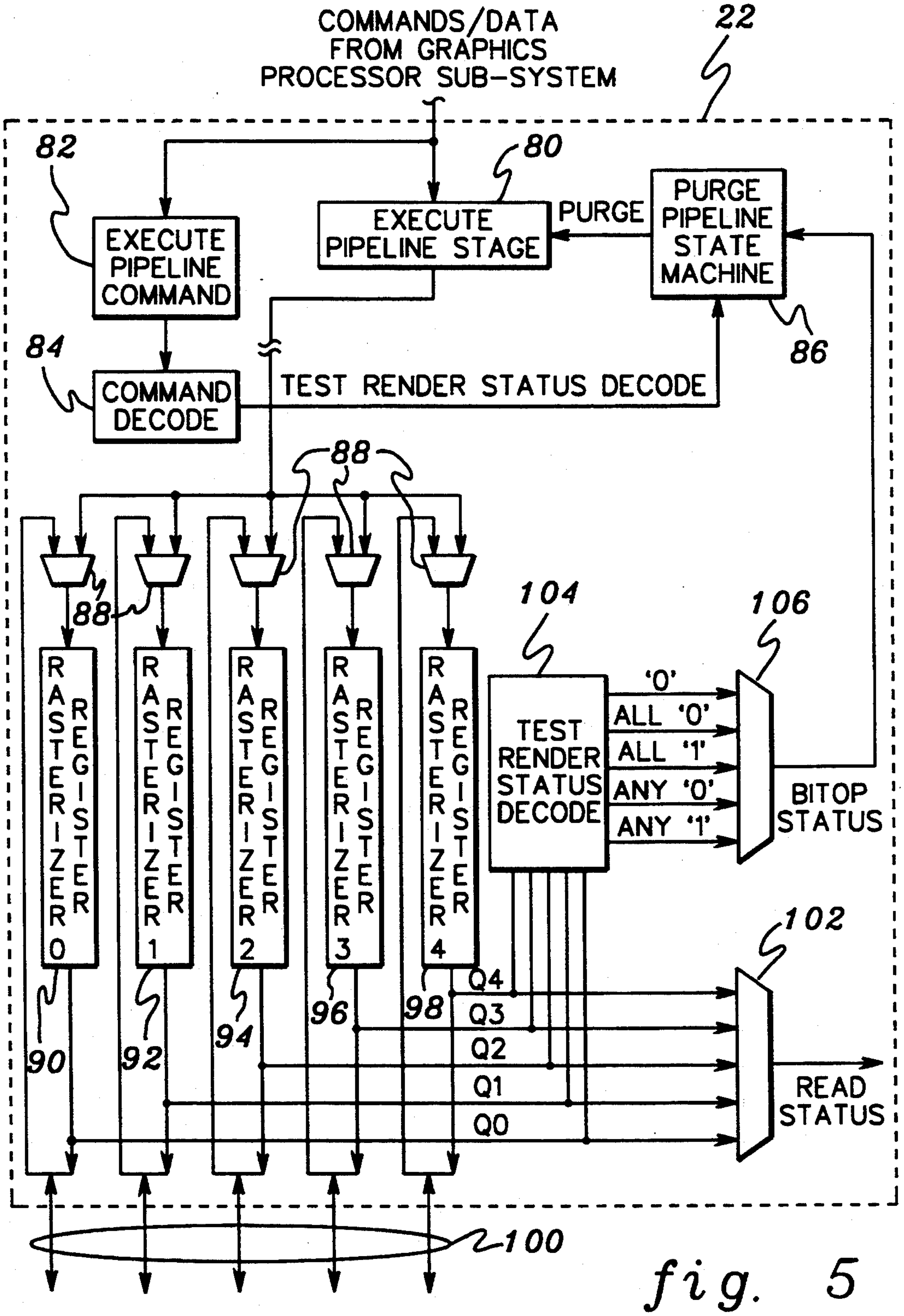
FIG. 5 is a block diagram representation of one embodiment of test render status logic pursuant to the present invention for the BLT chip of the rendering sub-system of FIG. 2.

One hardware embodiment of test render status logic for bit block transfer circuit (22) (FIG. 2) is depicted in FIG. 5. This logic circuit is structured to purge or not purge commands/data of a conditional command block depending upon the status of one or more XBITs in the multiple rasterizers of the rendering sub-system. The interleaved stream of commands/data are received by BLT 22 from the graphics processor sub-system, and commands are initially copied to an execute pipeline command block 82. Block 82 essentially comprises a register for temporarily storing in sequence received commands. Command decode logic 84 accesses stored commands in execute pipeline command 82 and outputs based thereon a test render status decode signal which is fed to a purge pipeline state machine 86. The test render status decode signal will control the purging of subsequent pipeline commands in the stream of interleaved commands and data received by BLT 22. Essentially, a purge function operates to prevent commands and data from being passed to subsequent processing elements within BLT 22, and ultimately from being rendered by the rasterizers connected thereto. An execute pipeline stage 80 is responsive to the purge signal generated by purge pipeline state machine 86. In normal operation, stage 80 executes the stream of interleaved commands and data received by the rendering sub-system.

The output of execute pipeline stage 80 is coupled to a first input to each of a plurality of parallel connected multiplexers 88. The output of each multiplexer 88 is fed to a respective one of five parallel connected pipeline registers, i.e., "rasterizer 0 register" 90, "rasterizer 1 register" 92, "rasterizer 2 register" 94, "rasterizer 3 register" 96 and "rasterizer 4 register" 98. The output of each register 90, 92, 94, 96 & 98 is fed, via a bidirectional bus 100, to a respective one of the parallel connected rasterizers (24) (FIG. 2) in the rendering sub-system. The status of each rasterizer (via the XBITs) is supplied back to BLT 22 as shown through the appropriate dual bus 100 to a second input of the respective multiplexer 88. (Buses 100 contain appropriate drivers and receivers for dual transfer of information thereon, i.e., for the writing of information to rasterizers (24) or the reading of information therefrom.)

Test render status logic pursuant to the present invention performs a status operation based upon status results obtained from the rasterizers (24) (FIG. 2) coupled to bidirectional rasterizer buses 100. A read status (or render status) signal is generated within the BLT by a multiplexer 102 which is connected to access the signal on each of the five buses, i.e., Q0, Q1, Q2, Q3 & Q4. In addition, a test render status decode circuit 104 samples data from each rasterizer bus Q0, Q1, Q2, Q3 & Q4 to determine whether a particular conditional command has been satisfied or not satisfied, i.e., based on a conditional command received at execute pipeline command 82. Five outputs are provided from decode logic 104, namely, a "don't care" or '0' output, an "all '0'" output, an "all '1'" output, an "any '0'" output, and an "any '1'" output. These signals are provided to a multiplexer 106 which selects which decode signal to use and returns a BITOP status signal to purge pipeline state machine 86. If appropriate, machine 86 can then purge all commands within the subject conditional block of commands and data until another test render status command is received by BLT 22.

By way of example and as noted originally, annotation text and polymarkers are often used to label a point in space. In such a case, the visibility of a single point determines whether the entire polymarker or text-string is drawn. Pursuant to the present invention, a rasterizer, in conjunction with the bit block transfer chip, supports single point Z testing via a draw points command and a set Z test command. Single point Z testing is a two step process. First, an X,Y and Z coordinate is sent to the Z buffer. A Z test is then performed and the result is saved in a ZBIT register. Next, the Z test is set to "ZBIT=-True," and the vertex data of the polymarker (or annotation text) is allowed to follow.

Figure 6:
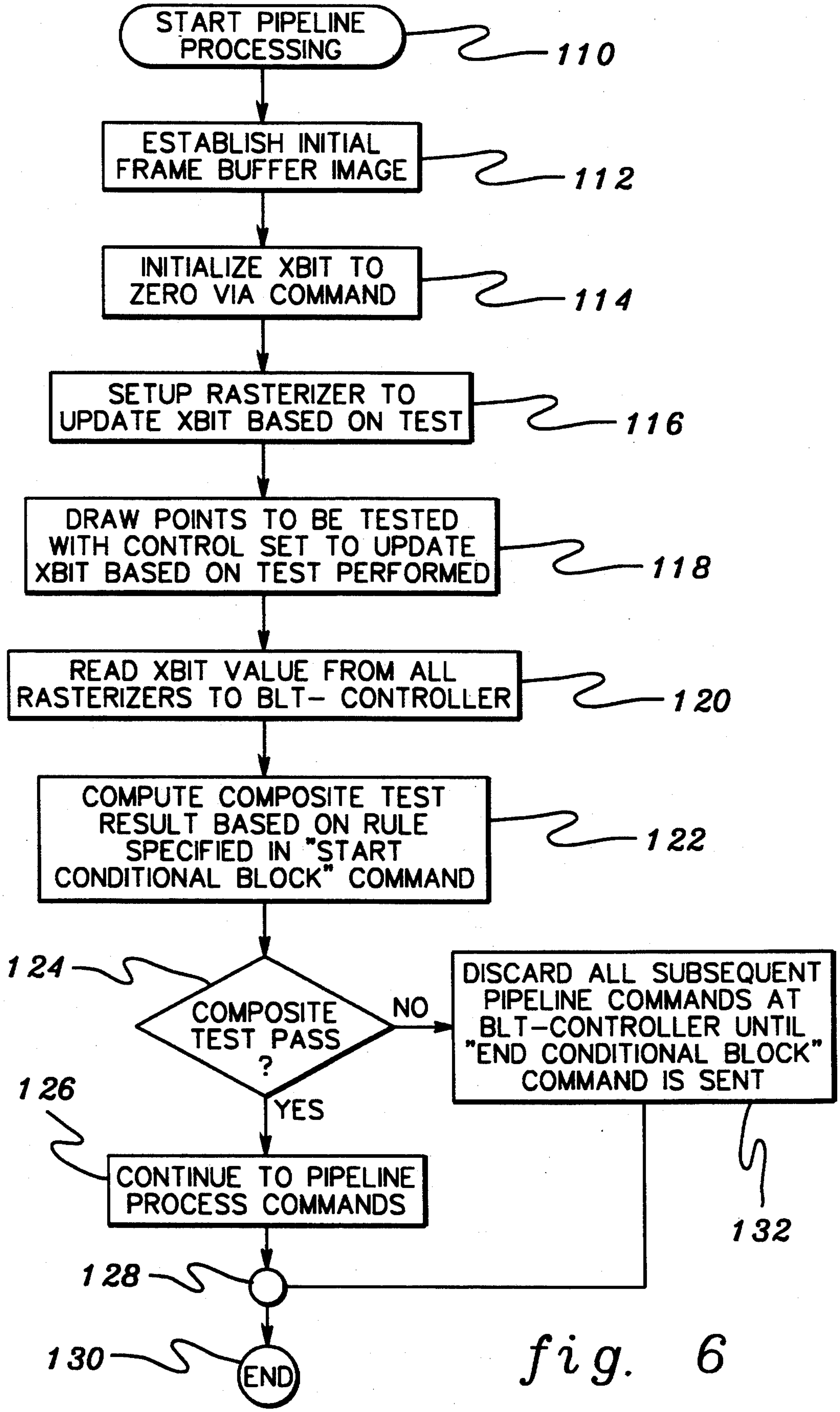
FIG. 6 is a flowchart of one embodiment of pipeline processing pursuant to the present invention.

A sample stream of interleaved commands and data to be pipeline processed pursuant to the present invention may consist of:

.
.
.
Polygon command
X,Y,Z of vertex 1
X,Y,Z of vertex 2
X,Y,Z of vertex 3
.
.
.
X,Y,Z of vertex n
------------------------Start of Conditional Block
Command for send point and set ZBIT
(X,Y,Z) coordinate being annotated
Command to set polyline color
Red, green, blue color components
Polyline command (for rendering polymarker)
X,Y,Z of first point of polymarker's polyline glyph
X,Y,Z of second point of polymarker's polyline glyph
X,Y,Z of third point of polymarker's polyline glyph
.
.
.
X,Y,Z of final point of polymarker's glyph
Command to restore the Z buffer to normal Z test
------------------------End of Conditional Block If the conditional test fails, then pursuant to the invention the commands sent between the start of the conditional block and the end of the conditional block are purged by the BLT chip and do not result in pixels being rendered by the rasterizers. Conversely, if the conditional test passes, then the commands are allowed to pass and are acted upon by the rasterizers (24) (FIG. 2). One system process overview is next described with reference to FIG. 6.

After starting pipeline processing of the stream of interleaved commands and data, 110 "Start Pipeline Processing," initial frame buffer values are generated, 112 "Establish Initial Frame Buffer Image." Any available rendering technique may be used to establish the background image. The image is assumed to be established from an initial part of the stream of commands and data being pipeline processed through the graphics adapter. At time T0, a command in the stream of commands and data causes initialization of XBIT to a predetermined value, for example, "0", 114 "Initialize XBIT To Zero Via Command." The rasterizers are set up to allow updating of the XBIT based on a predetermined test command, 116 "Set up Rasterizer To Update XBIT Based On Test."

Next, points are drawn to be tested with the rasterizer control set to update the XBIT based on the test performed, 118 "Draw Points To Be Tested With Control Set To Update XBIT Based On Test Performed." This assumes initiation of the conditional block by receipt of a start conditional block command. The XBIT values are then read from all rasterizers by the BLT controller, 120 "Read XBIT Value From All Rasterizers To BLT-Controller," and a composite test result is computed based on the specified rule within the conditional block, 122 "Compute Composite Test Result Based On Rule Specified In "Start Conditional Block" Command." Inquiry is then made whether the composite result passes the stated condition, 124 "Composite Test Pass? "If "Yes" processing continues in a pipeline fashion, 126 "Continue To Pipeline Process Commands," and conditional block processing is terminated, 130 "End."

If the composite result fails the test, then purging of all commands within the conditional block is accomplished by the rendering sub-system, 132 "Discard All Subsequent Pipeline Commands at BLT-Controller Until "End Conditional Block" Command is Sent," after which processing passes through junction 128 and conditional block processing is terminated, 130 "End."

From the above description, those skilled in the art will recognize that the presented graphics processor sub-system will see no interruption in the pipeline assuming that the conditional command is satisfied. A continuous stream of commands and data passes through the graphics processor sub-system. The approach presented provides overall performance gain by allowing the pipeline to remain as unidirectional and as uninterrupted as possible. The floating-point unit in the graphics processor sub-system continues to process data regardless of whether the data is ultimately rendered.

Further, the techniques employed are applicable to any rasterizer, and can be easily extended for use in a multi-rasterizer environment. The hardware logic concepts presented can also accommodate utility buffer results and rasterizer results if desired. Also, the presented invention provides a mechanism for searching an array of pixels solely within a rendering sub-system at the frame buffer level, without tying up the floating-point unit. Additionally, the burden of determining whether any pixels have been rendered by a set of rasterizer commands is lifted from the floating-point unit and implemented in hardware within the rendering sub-system. The concepts presented can be expanded and generalized to any computer system. Obviously, to the extent performance is enhanced, commercial advantage is attained. The concepts presented are inexpensive to implement and readily implementable with existing technology.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A graphics computer system for pipeline processing a stream of commands and data containing a conditional command the execution of which requires processing results from a prior portion of said stream of commands and data, said conditional command having a portion of said stream of commands and data associated therewith affecting multiple pixel values, said pipeline processing system comprising:

first processing means for receiving said stream of commands and data and commensurate therewith for commencing serial processing of said received stream in a pipeline fashion;

second processing means connected to said first processing means for continuing serial pipeline processing of said received stream of commands and data, said second processing means including means for identifying a conditional command within said stream of commands and data; and wherein said second processing means includes means for executing said conditional command based upon prior processing results for affecting the multiple pixel values whenever a given condition for said conditional command is met, otherwise said second processing means including means for purging said portion of said stream of commands and data associated with said conditional command for affecting the multiple pixel values such that pipeline processing of said stream of commands and data remains unbroken unless said portion of said stream of commands and data associated with said conditional command is purged by said second processing means.

2. The computer system of claim 1, wherein said system comprises a graphics display system, and wherein said first processing means comprises a geometry processing sub-system and said second processing means comprises a raster processing sub-system.

3. The computer system of claim 2, wherein said raster processing sub-system includes hardware logic that tracks the given condition upon which said conditional command depends.

4. The computer system of claim 3, wherein said hardware logic of said raster processing sub-system includes at least one XBIT data cell, and wherein said raster processing sub-system including means for referencing data Of said at least one XBIT data cell when deciding whether the condition upon which said conditional command depends is met.

5. The computer system of claim 4, wherein said raster processing sub-system includes multiple parallel connected rasterizers each of which receives a portion of said stream of commands and data via a bit block transfer circuit coupled to an input to said raster processing sub-system, each of said multiple parallel rasterizers including at least one XBIT data cell, and wherein said bit block transfer circuit includes means for reading a status of data of said XBIT data cells within said multiple parallel rasterizers.

6. The computer system of claim 4, wherein said at least one XBIT comprises one of a ZBIT for holding a result of a Z buffer compare, a UBIT for holding a result of a utility compare, or an RBIT for signalling whether a pixel has been drawn to a frame buffer of said raster processing sub-system.

7. The computer system of claim 6, wherein said at least one XBIT includes a ZBIT and wherein said raster processing sub-system includes means for modifying said ZBIT in response to a control command in said stream of commands and data.

8. The computer system of claim 6, wherein said at least one XBIT includes a UBIT and wherein said raster processing sub-system includes hardware logic for modifying said UBIT subsequent a utility compare.

9. A graphics display adapter designed to handle a conditional command, said graphics display adapter comprising:

a rendering sub-system having an input for receiving a stream of commands and data, said rendering sub-system including (i) a bit block transfer node connected to receive the stream of commands and data, (ii) rasterizer means connected to said bit block transfer node such that bidirectional transfer of data between said rasterizer means and said bit block transfer node is allowed, (iii) frame buffer means connected to the output of said rasterizer means for storing distance-related data, occlusion mask data, and color component data; and said bit block transfer node and said rasterizer means containing hardware logic for execution within said rendering sub-system of a conditional command forming part of said received stream of commands and data so as to affect multiple pixel values.

10. The graphics display adapter of claim 9, wherein said rasterizer means includes at least one XBIT containing data representative of the condition upon which said conditional command depends.

11. The graphics display adapter of claim 10, wherein said rasterizer means includes multiple parallel connected rasterizers each of which includes at least one XBIT, and wherein said bit block transfer node includes hardware logic for reading the status of said XBITs disposed within said multiple parallel rasterizers.

12. The graphics display adapter of claim 11, wherein said conditional command has a portion of said stream of commands and data associated therewith for affecting the multiple pixel values, and wherein said bit block transfer node includes hardware logic for purging that portion of said stream of commands and data associated with said conditional command whenever said conditional command is unmet as determined by reference to the status of said XBITs.

13. The graphics display adapter of claim 10, wherein said at least one XBIT comprises one of a ZBIT for holding a result of a Z buffer compare, a UBIT for holding a result of a utility compare, or an RBIT for signalling whether a pixel has been drawn to the frame buffer.

14. The graphics display adapter of claim 13, wherein said at least one XBIT includes a ZBIT and wherein said rasterizer means includes Z modify hardware logic for controlling updating of said ZBIT.

15. The graphics display adapter of claim 13, wherein said at least one XBIT includes a UBIT and wherein said rasterizer means includes utility modify hardware logic for controlling updating said UBIT.

16. A method for pipeline processing a stream of commands and data through a computer processing system having first and second serially connected processing means, said stream of commands and data containing at least one conditional command the execution of which requires processing results from a prior portion of said command and data stream, each said conditional command having a portion of said stream of commands and data associated therewith for affecting multiple pixel values, said pipeline processing method comprising the steps of:

(a) receiving said stream of commands and data at an input to said first processing means;

(b) simultaneous with said step (a), commencing serial processing of said received stream of commands and data through said first processing means and said second processing means in a pipeline fashion;

(c) identifying a conditional command within said stream of commands and data; and (d) executing within said second processing means said identified conditional command for affecting multiple pixel values if a condition for said conditional command is met based upon prior processing results, otherwise employing said second processing means to purge that portion of said stream of commands and data associated with said identified conditional command for affecting the multiple pixel values such that pipeline processing of said stream of commands and data remains unbroken unless the conditional command is purged by said second processing means.

17. The pipeline processing method of claim 16, wherein said method further comprises the step of providing said second processing means with at least one XBIT and associated hardware logic that tracks a status of the condition upon which said identified conditional command depends, and wherein said executing step (d) includes referencing said at least one XBIT in deciding whether to execute said conditional command or to purge that portion of the interleaved stream of commands and data associated with said conditional command.

18. The pipeline processing method of claim 17, wherein said computer processing system comprises a graphics display system wherein said first processing means comprises a graphics processor sub-system and said second processing means comprises a rendering sub-system, said executing/purging step (d) being accomplished within said rendering sub-system.

19. A computer system for pipeline processing a stream of commands and data containing a conditional command the execution of which requires processing results from a prior portion of said stream, as associated with multiple pixel values, said processing results meeting a given condition, said conditional command having a portion of said stream of commands and data associated therewith, said pipeline processing system comprising:

first processing means for receiving said stream of commands and data and commensurate therewith for commencing serial processing of said received stream in a pipeline fashion;

second processing means connected to said first processing means for continuing serial pipeline processing of said received stream of commands and data, said second processing means including means for identifying a conditional command within said stream of commands and data; and wherein said second processing means includes means for executing said conditional command based upon prior processing results as associated with multiple pixel values whenever the condition for said conditional command is met, otherwise said second processing means including means for purging that portion of said stream of commands and data associated with said conditional command such that pipeline processing of said stream of commands and data remains unbroken unless said portion of said stream of commands and data associated with said conditional command is purged by said second processing means.

20. A method for pipeline processing a stream of commands and data through a computer processing system having first and second serially connected processing means, said stream of commands and data containing at least one conditional command the execution of which requires processing results from a prior portion of said stream of commands and data associated with multiple pixel values, said processing results meeting a given condition, each said conditional command having a portion of said stream of commands and data associated therewith, said pipeline processing method comprising the steps of:

(a) receiving said stream of commands and data at an input to said first processing means;

(b) simultaneous with said step (a), commencing serial processing of said received stream of commands and data through said first processing means and said second processing means in a pipeline fashion;

(c) identifying a conditional command within said stream of commands and data; and (d) executing within said second processing means said identified conditional command if the condition for said conditional command is met based upon prior processing results associated with multiple pixel values, otherwise employing said second processing means to purge that portion of said stream of commands and data associated with said identified conditional command such that pipeline processing of said stream of commands and data remains unbroken unless the conditional command is purged by said second processing means.

* * * * *